(12) United States Patent
Kamenetz et al.

(10) Patent No.: US 8,536,821 B2
(45) Date of Patent: Sep. 17, 2013

(54) REDUNDANT INTERFACE FOR A STEPPER MOTOR

(75) Inventors: Jeffry K. Kamenetz, Windsor, CT (US); Dana N. Switzer, Simsbury, CT (US); William Betterini, Rocky Hill, CT (US); John M. O'Neil, Litchfield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 22 days.

(21) Appl. No.: 13/239,486

(22) Filed: Sep. 22, 2011

(65) Prior Publication Data
US 2013/0076291 A1  Mar. 28, 2013

(51) Int. Cl.
*H02P 8/00* (2006.01)
*H02P 6/00* (2006.01)

(52) U.S. Cl.
USPC ....... 318/696; 318/685; 318/557; 318/400.29

(58) Field of Classification Search
USPC .............................. 318/696, 685, 557, 400.29
See application file for complete search history.

(56) References Cited

U.S. PATENT DOCUMENTS

| | | | |
|---|---|---|---|
| 3,978,659 A | 9/1976 | Smith et al. | |
| 4,029,952 A | 6/1977 | Giras et al. | |
| 4,521,871 A | 6/1985 | Galdun et al. | |
| 4,562,528 A | 12/1985 | Baba | |
| 4,797,884 A | 1/1989 | Yalowitz et al. | |
| 4,890,284 A | 12/1989 | Murphy et al. | |
| 4,937,777 A | 6/1990 | Flood et al. | |
| 5,128,943 A | 7/1992 | Tulpule et al. | |
| 5,192,873 A | 3/1993 | Wrenbeck et al. | |
| 5,279,107 A | 1/1994 | Meisner et al. | |
| 6,332,506 B1 * | 12/2001 | Kifuku | 180/443 |
| 8,063,603 B2 * | 11/2011 | Reddy | 318/685 |
| 2010/0033064 A1 * | 2/2010 | Tanaka et al. | 310/67 R |

* cited by examiner

*Primary Examiner* — Erick Glass
(74) *Attorney, Agent, or Firm* — Carlson, Gaskey & Olds, P.C.

(57) ABSTRACT

A multi-channel stepper motor controller has at least a first and second stepper motor control channel. Each of the control channels has a solid state switching circuit operable to connect the control channel to a stepper motor.

17 Claims, 3 Drawing Sheets

REDUNDANT INTERFACE FOR A STEPPER MOTOR

TECHNICAL FIELD

The present disclosure relates generally to stepper motor controls, and more particularly to a system for controlling a single stepper motor using two or more stepper motor control channels.

BACKGROUND OF THE INVENTION

Stepper motors are typically controlled based on sensed individual phase currents of the controlled stepper motor. A controller receives the sensed phase currents from phase current sensors located on each phase of the stepper motor. The controller then communicates with, and controls, the stepper motor using an H-bridge interface. The stepper motor interface can be arranged as either a unipolar interface or a bipolar (two phase) H-bridge interface, with the arrangement depending on the particular stepper motor. The H-bridge interface is controlled via a controller that operates multiple switches within the H-bridge interface, thereby causing the H-bridge interface to output proper stepper motor control signals.

In order to introduce redundancy and protect against a failure in the stepper motor controls, some stepper motor implementations use two or more stepper motor control channels to provide control signals to the stepper motor. In configurations using multiple stepper motor control channels, only a single control channel can provide control signals to the stepper motor at a time. In order to isolate the inactive stepper motor control channel from the stepper motor, and thereby prevent both controllers from transmitting control signals to the stepper motor simultaneously, a mechanical relay is used to physically disconnect one control channel from the stepper motor and connect the other control channel to the stepper motor.

SUMMARY OF THE INVENTION

A multi-channel stepper motor controller has a first stepper motor control channel and a second stepper motor control channel. Each of the control channels has a solid state switching circuit operable to connect a corresponding stepper motor control channel to a stepper motor.

Also disclosed is a method of controlling a stepper motor having the steps of maintaining a connection between a first stepper motor control channel and a stepper motor using a solid state switching circuit in the first stepper motor control channel, and maintaining a disconnection between a second stepper motor control channel and the stepper motor using a solid state switching circuit in the second stepper motor control channel.

These and other features of the present invention can be best understood from the following specification and drawings, the following of which is a brief description.

DETAILED DESCRIPTION

Figure 1:
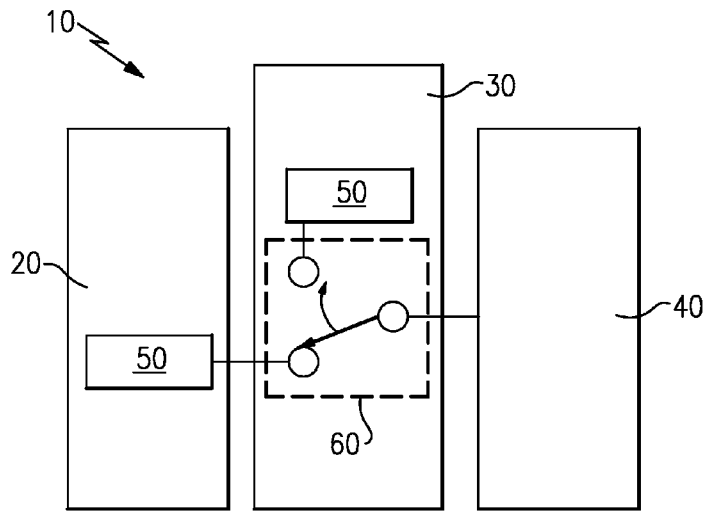
FIG. 1 illustrates an example multi-channel stepper motor control system.

FIG. 1 illustrates a functional example multi-channel stepper motor control system 10 having two control channels 20, 30 each of which can individually control an attached stepper motor 40. Each control channel 20, 30 includes a stepper motor drive 50 that is connected to the stepper motor 40 via a switch 60. The switch 60 has two possible positions. In the first position (illustrated in FIG. 1) the first control channel 20 is connected to the stepper motor 40 and the second control channel 30 is electrically isolated from the stepper motor 40. In the second position, the second control channel 30 is connected to the stepper motor 40 and the first control channel 20 is electrically isolated from the stepper motor 40. Thus, the stepper motor only receives control signals from a single stepper motor drive 50 at a given time. The switch 60 is a solid state switching circuit and can be multiple solid state switches arranged throughout the control channels 20, 30 to provide the above described functionality.

Figure 2:
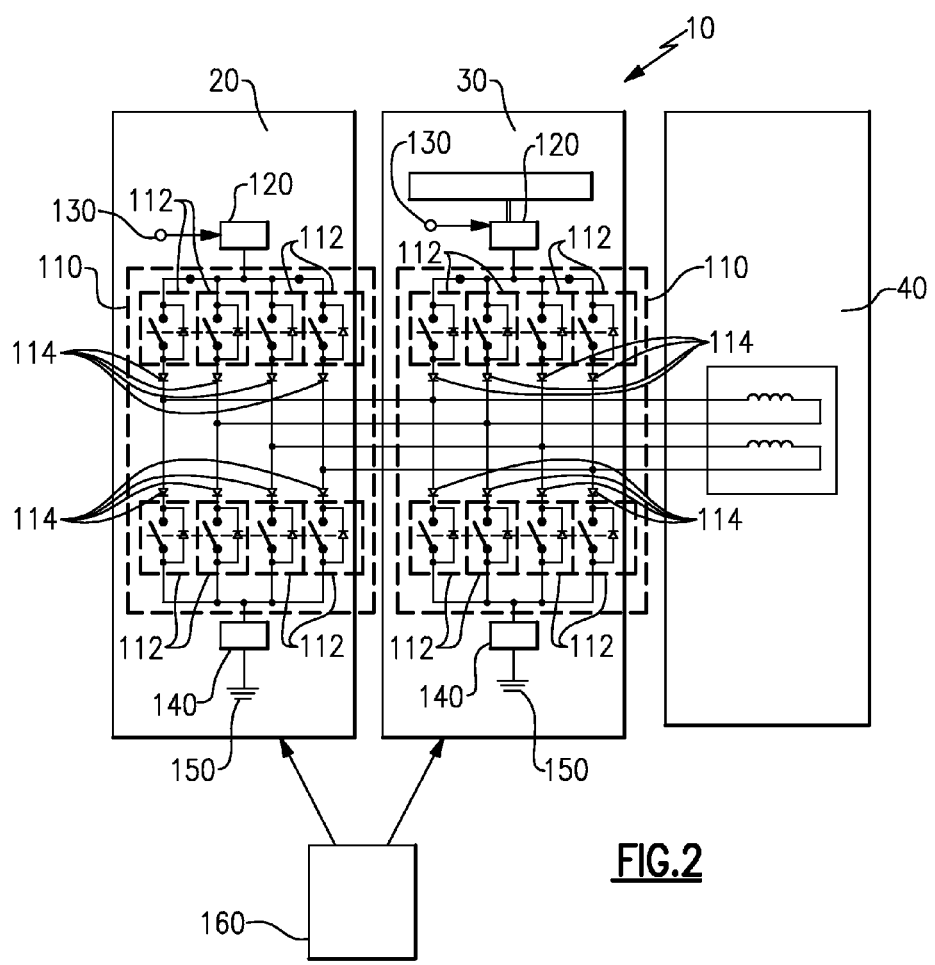
FIG. 2 illustrates the example multi-channel stepper motor control system of FIG. 1 in greater detail.

FIG. 2 illustrates the multi-channel stepper motor control system 10 of FIG. 1 in greater detail. Each of the control channels 20, 30 includes an adapted bipolar dual H-bridge motor drive circuit 110. The adapted dual H-bridge circuit 110 includes multiple transistor/body diode pairs 112 arranged in a standard bipolar dual H-bridge configuration. The adapted dual H-bridge additionally includes a backflow prevention diode 114 in series with each of the transistor/body diode pairs 112. The backflow prevention diode 114 is arranged anode to anode with the body diode of the corresponding transistor/body diode pair 112, thus preventing current backflow when the transistor in the transistor/body diode pair 112 is open, but still allowing current flow through the H-bridge circuit 110 to the stepper motor 40 when the transistor in the transistor/body diode pair is closed.

Each of the control channels 20, 30 also includes a master high side switch 120 connecting a power source 130 to the H-bridge circuit 110, and a master low side switch 140 connecting each of the adapted dual H-bridge circuits 110 to ground 150. Channel In-Control control logic 160 controls the state of the master high side switches 120, HSS/LSS switches 112, and the master low side switches 140, and thereby determines which control channel 20, 30 provides control signals to the stepper motor 40. Since each of the control channels 20, 30 is linked to the stepper motor via both a master high side switch 120, HSS/LSS switches 112, and a master low side switch 140, either channel 20, 30 is able to be electrically isolated from the stepper motor 40 if one of the master high side switch 120, HSS/LSS switches 112, or the master low side switch 140 in the corresponding channel 20, 30 fails in a closed state.

While the illustrated example of FIG. 2 shows the channel in-control logic 160 independent of either control channel 20, 30 the channel in-control logic could alternately be encompassed within the first control channel 20 or the second control channel 30.

Figure 3:
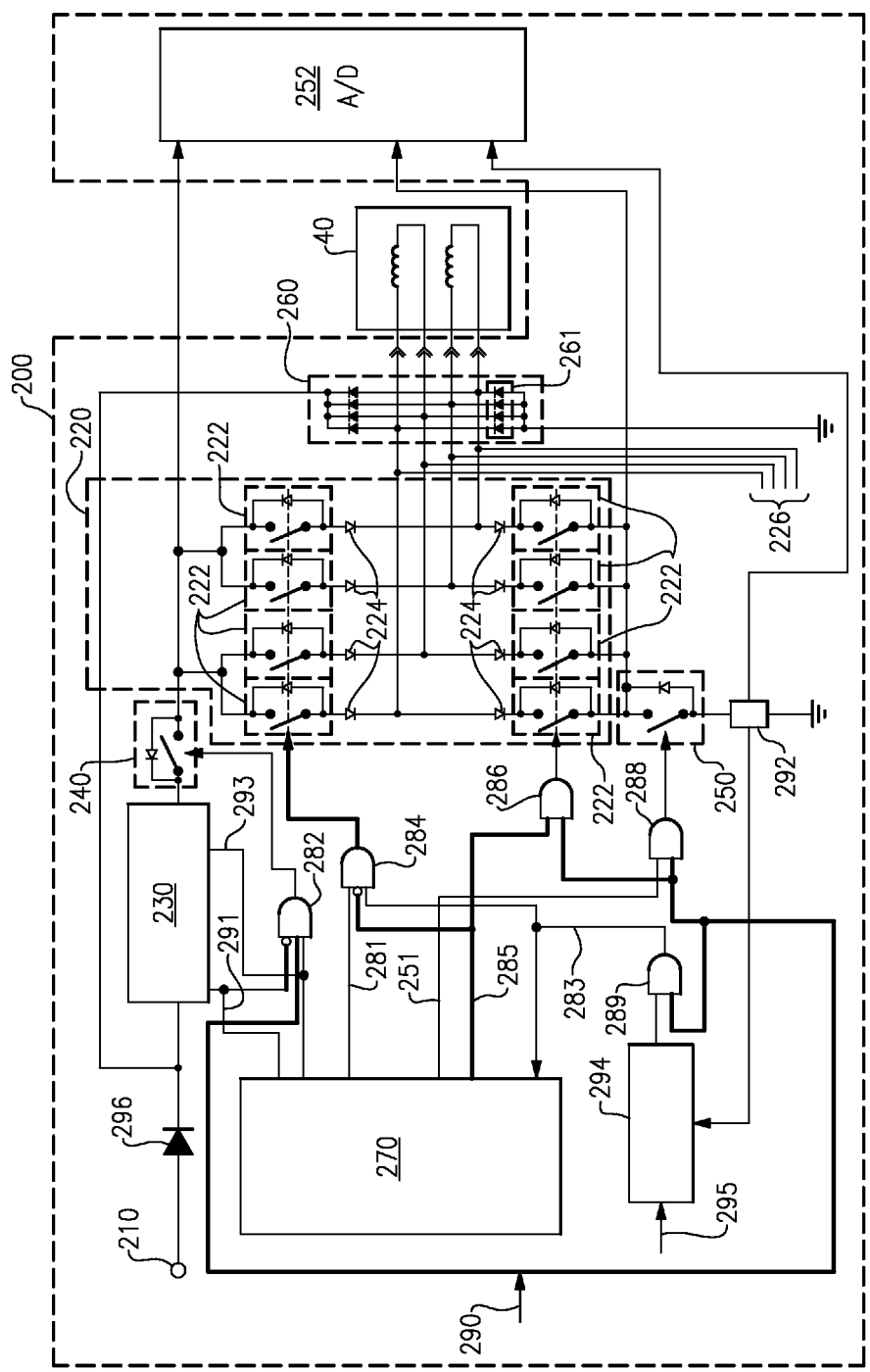
FIG. 3 illustrates a bipolar example of a single channel of the multi-channel stepper motor control system of FIGS. 1 and 2.

FIG. 3 illustrates a more detailed example of a single channel 20, 30 of the multi-channel stepper motor control system 10 of FIGS. 1 and 2. Inside the control channel 200 illustrated in FIG. 3 is a bipolar interface for a stepper motor 40. The control channel 200 draws power from a power source 210 into the adapted dual H-bridge circuit 220 through a backflow prevention diode 296, an overcurrent protection circuit 230, and a master high side switch 240. The master high side switch 240 is a solid state switch, such as a metal oxide semiconductor field effect transistor (MOSFET) and includes a body diode. Alternately, another type of solid state electrical switch could be used in place of a MOSFET to the same effect.

Power is passed through the adapted dual H-bridge circuit 220 and into the stepper motor 40. Transistor/body diode pairs 222 in the adapted dual H-bridge circuit 220 are controlled via a microprocessor 270, through a plurality of logic gates 284, 286, and a pulse width modulator 294 in order to provide proper controls to the power passing through the adapted dual H-bridge circuit 220, and thereby control the stepper motor 40. The pulse width modulator 294 receives a reference to the closed loop current control 295, and an input from a current sensor 292 and can adjust the pulse width modulation based on the sensed current, thereby creating a feedback control. The adapted dual H-bridge circuit 220 is connected to a ground/return via a master low side switch 250.

In order for the control channel 200 to provide controls to the stepper motor 40, both the master high side switch 240 and the master low side switch 250 must be in a closed state, thereby allowing for an unbroken path from the power source 210 through a backflow prevention diode 296, an overcurrent protection circuit 230, the adapted dual H-bridge circuit 220, through the stepper motor 40, and back through the adapted dual H-bridge circuit 220 and the master low side switch 250 to ground. When either the master high side switch 240 or the master low side switch 250 is open, the current path is broken and the control channel 200 is electrically isolated from the stepper motor 40. For redundancy in case of microprocessor 270 faults, the HSS/LSS Switches 222 are also opened upon deactivation of a channel enable signal 290. Note that the channel enable signal is partially generated from microprocessor independent health monitoring circuits such as watchdog timers.

Control signals for the adapted dual H-bridge circuit 220 are passed through a set of adapted dual H-bridge AND gates 284, 286. The high side switch control AND gate 284 represents four AND gates arranged in a known fashion to provide control inputs to each of the four high side transistor/body diode pairs 222. Likewise, the low side switch control AND gate 286 represents four AND gates arranged in a known fashion to provide control inputs to each of the four low side transistor/body diode pairs 222.

The high side switch control AND gates 284 each accept a high side switch command input 281, a PWM control signal input 283 and an inverted low side switch command input. The high side switch control AND gate 284, combines the three inputs 281, 283, 285 and outputs a control signal closing an adapted dual H-bridge high side switch only when the PWM control signal 283 indicates the switch should be closed, the high side switch control signal 281 indicates it should be closed, and the corresponding (that is, on the same side of the H-Bridge) low side switch command signal 285 indicates that the corresponding low side switch should be open.

The PWM control signal input is wrapped around into the microprocessor 270, thereby allowing the microprocessor 270 to detect a fault in the open circuit phases of the stepper motor 40. When at least one phase of the stepper motor 40 faults in an open circuit, the PWM duty cycle increases substantially. The microprocessor 270 detects the increased PWM duty cycle and determines that a fault has occurred within the stepper motor 40. The microprocessor 270 can then initiate a predetermined response action, such as isolating both channels 20, 30 of the stepper motor control system 10, thereby shutting off the stepper motor 40.

Similarly, the low side switch control AND gate 286 accepts a low side command signal output from the microprocessor 270, and a channel enable signal 290. The channel enable signal 290 originates from the channel in-control logic 160 and is high when the illustrated channel of FIG. 3 should be in-control. Thus, each low side adapted dual H-bridge switch 222 is closed only when the corresponding low side command indicates the switch 222 should be closed and when the channel enable signal 290 indicates that the illustrated channel should be in-control.

The channel enable signal 290 also provides an enable signal to the master high side switch 240 through a high side control switch AND gate 282 and to the master low side switch 250 through a low side control switch AND gate 288. The master high side control switch AND gate 282 closes the master high side control switch 240 when the overcurrent indicator 230 does not indicate that an overcurrent is present, the channel control logic 160 indicates that the illustrated channel should be in-control via the channel enable signal 290, and the microprocessor 270 indicates that the master high side switch 240 should be closed. The overcurrent input 291 from the overcurrent detector 230 prevents the master high side switch 240 from being engaged as long as an overcurrent is detected, thereby protecting the adapted dual H-bridge circuit 220. Once the overcurrent indicator 230 indicates an overcurrent, it can be reset by toggling the master high side switch command 293 originating at microprocessor 270 from "off" to "on".

The master low side switch 250 is controlled via an AND gate 288 that closes the master low side switch 250 when the channel enable signal 290 indicates that the illustrated channel should be in-control and when the microprocessor 270 indicates that the low side switch should be closed via a master low side control switch control signal 251.

Included in the adapted dual H-bridge circuit 220, and in series with each of the transistor/body diode pairs 222 is a current backflow prevention diode 224. The current backflow prevention diode 224 prevents the body diode in each of the transistor/body diode pairs 222 from allowing reverse current to flow. A backflow prevention diode 224 is included on both the high side and the low side transistor/body diode pairs 222 of the adapted dual H-bridge circuit 220.

The current sensor 292 within the control channel 200 detects the current that is returned from the adapted dual H-bridge circuit to a ground through the master low side switch 250. This current sensor reading is passed to the Pulse Width Modulator 294, and allows the Pulse Width Modulator 294 to provide Pulse Width Modulation for the stepper motor based on the single current sensor reading without requiring a current sensor to detect the current through each phase of the stepper motor 40.

In FIG. 3, the wires depicted by 226 are connected to the second channel.

The control channel 200 also includes a plurality of anti-kickback diodes 260 and recirculation diodes 261 arranged as a grid. The anti-kickback diodes 260 prevent voltages from becoming excessive as current direction is changed during a stepping process. When using a pulse width modulation current control scheme, the recirculation diodes 261 allow energy stored in the stepper motor to be re-circulated through the adapted dual H-bridge circuit 220, thus minimizing the amount of power that is extracted from the power source 210.

FIG. 3 illustrates a single set of anti-kickback diodes 260 and recirculation diodes 261 for two control channels. Also, the power source 210 and the backflow prevention diode 296 are common elements to both channels. Additionally, there can be two sets of diodes 296, 260 and 261, one set for each channel.

For Built-In-Test (self-test) purposes, the voltage after the master high side switch 240 and the voltage before the master low side switch 250 is read by the microprocessor 270 via an analog-to-digital convertor 252. In addition, the stepper motor current also read via sensor 292.

Figure 4:
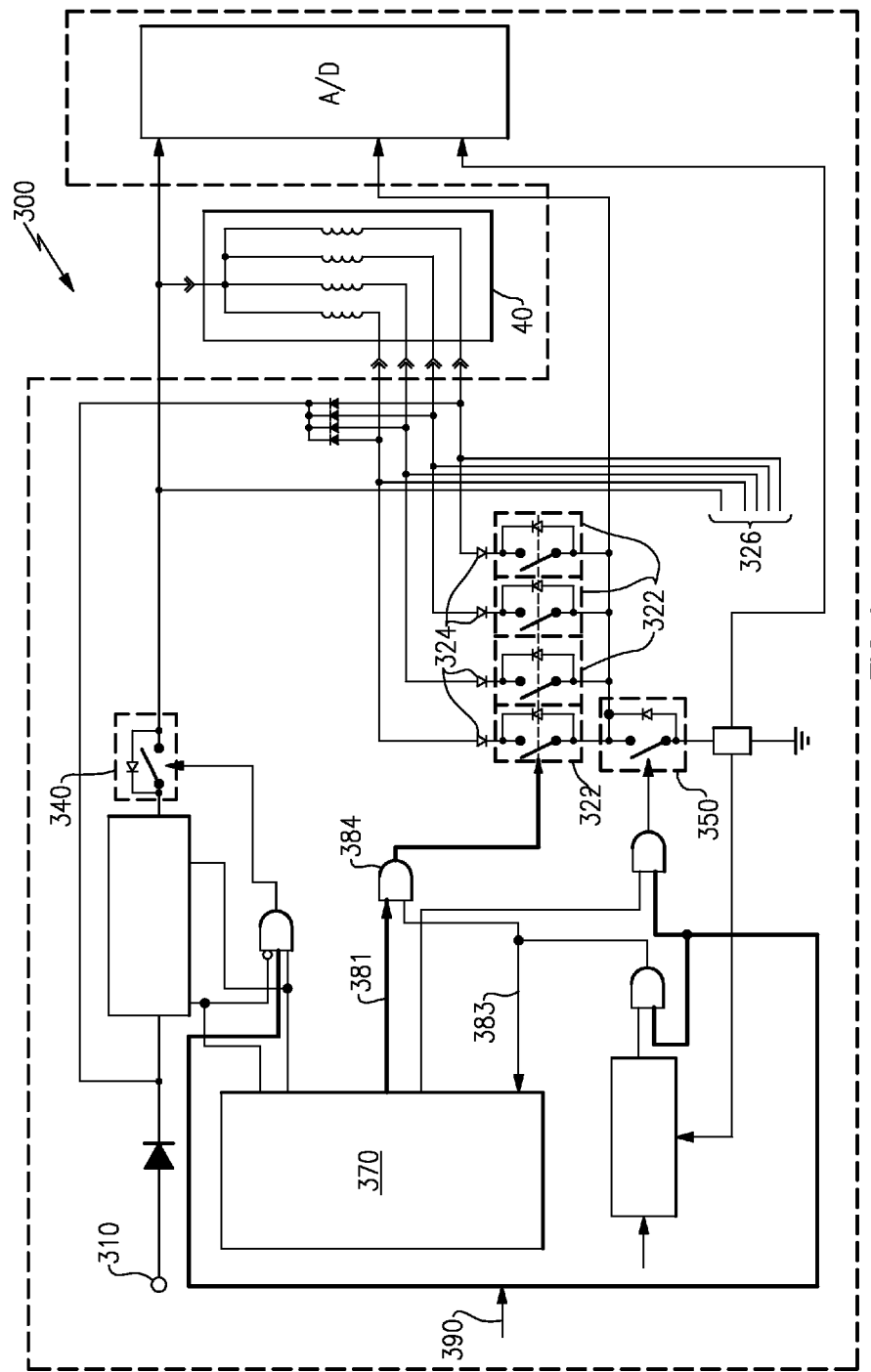
FIG. 4 illustrates a unipolar example of a single channel of the multi-channel stepper motor control system of FIGS. 1 and 2.

FIG. 4 illustrates a more detailed example of a single channel 20, 30 of the multi-channel stepper motor control system 10 of FIGS. 1 and 2. The control channel 300 illustrated in FIG. 4 is a unipolar interface for a stepper motor 40. The control channel 300 is constructed in a similar fashion to the bipolar control channel 200 illustrated in FIG. 3.

The low side switches 322 of the unipolar channel 300 differs from the adapted dual H-bridge 220 of the bipolar channel 200 in that the high side transistor/body diode pairs are omitted. Since only the low side transistor/body diode pairs 322 are present in the unipolar channel 300, only a single backflow prevention diode 324 is required for each leg of the adapted unipolar interface circuit 320. Likewise, the stepper motor 40 is arranged in a standard unipolar form. The unipolar interface in FIG. 4 has no recirculation diodes similar to the recirculation diodes 260 in adapted dual H-bridge circuit 220 in FIG. 3.

Due to the unipolar nature of the illustrated example of FIG. 4, only a single switch control AND gate 384 is used to control the adapted unipolar interface circuit 320. The single switch control AND gate has a switch command input 381 and a pulse width control input 383. As with the example of FIG. 3, the single switch control AND gate 384 is an arrangement of four AND gates configured in a known fashion to control the transistor/body diode pairs 322.

Aside from the above listed differences, the unipolar example operates in fundamentally the same manner as the bipolar example described above with both the master high side switch 340, the low side switches 322 and the master low side switch 350 being capable of individually electrically isolating the control channel 300 from the stepper motor 40. As in the adapted dual H-bridge circuit 220, disabling the low side switches 322 based on the channel enable signal 390 is optional and is performed as a redundancy against microprocessor 370 failures.

In both the examples of FIG. 3 and FIG. 4, a microprocessor 270, 370 is used to control the adapted dual H-bridge circuit 220 or the adapted unipolar interface circuit 320, and the master high side and master low side switches 240, 250, 340, 350. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A multi-channel stepper motor controller comprising: a first stepper motor control channel; a second stepper motor control channel; and each of said first stepper motor control channel and said second stepper motor control channel comprise a solid state switching circuit operable to connect a corresponding stepper motor control channel to a stepper motor, a stepper motor control circuit for connecting a power source to the stepper motor, a master high side switch connecting a high side of an adapted dual H-bridge to said power source, a master low side switch connecting a low side of said adapted dual H-bridge to a ground, and a microprocessor operable to control said adapted dual H-bridge stepper motor control circuit.

2. The multi-channel stepper motor of claim 1, wherein said stepper motor control circuit is an adapted dual H-bridge circuit.

3. The multi-channel stepper motor controller of claim 1, wherein one of said first stepper motor channel and said second stepper motor channel comprises a controller operable to control each of said high side switches and said low side switches.

4. The multi-channel stepper motor controller of claim 1, wherein said stepper motor control circuit is electrically isolated from said stepper motor when said master high side switch and said master low side switch are open.

5. The multi-channel stepper motor controller of claim 1, wherein said stepper motor control circuit is electrically isolated from said power source and said ground when at least one of said master high side switch and said master low side switch are open.

6. The multi-channel stepper motor controller of claim 1, wherein each of said stepper motor control circuits comprises a plurality of transistor/body diode pairs and plurality of backflow prevention diodes, wherein each of said backflow prevention diodes is arranged in series with one of said transistor/body diode pairs.

7. The multi-channel stepper motor controller of claim 6, wherein said backflow prevention diodes and the body diodes of said transistor/body diode pairs are arranged anode to anode.

8. The multi-channel stepper motor controller of claim 6, wherein each of said transistor/body diode pairs is a Metal Oxide Semiconductor Field Effect Transistor (MOSFET).

9. The multi-channel stepper motor controller of claim 1, wherein each of said high side switches and said low side switches is a transistor/body diode pair.

10. A method of controlling a stepper motor comprising the steps of:
maintaining a connection between a first stepper motor control channel and a stepper motor using a solid state switching circuit in said first stepper motor control channel, wherein said solid state switching circuit is controlled via a channel in-control logic circuit;
maintaining a disconnection between a second stepper motor control channel and the stepper motor using a solid state switching circuit in said second stepper motor control channel, wherein said solid state switching circuit is controlled via the channel in-control logic circuit; and wherein each of the first stepper motor control channel and the second stepper motor control channel includes a stepper motor control circuit for connecting a power source to the stepper motor, a master high side switch connecting a high side of an adapted dual H-bridge to said power source, a master low side switch connecting a low side of said adapted dual H-bridge to a ground, and a microprocessor operable to control said adapted dual H-bridge stepper motor control circuit.

11. The method of claim 10, wherein said step of maintaining a connection between said first stepper motor control channel and said stepper motor comprises maintaining a master high side switch connecting a power source to an adapted stepper motor control circuit of said first stepper motor control channel in a closed state.

12. The method of claim 10, wherein said step of maintaining a connection between said first stepper motor control channel and said stepper motor comprises maintaining a master low side switch connecting an adapted stepper motor control circuit of said first stepper motor control channel and a ground in a closed state.

13. The method of claim 10, wherein said step of maintaining a disconnection between said second stepper motor control channel and the stepper motor comprises blocking current backflow from said stepper motor through an adapted stepper motor control circuit using a plurality of backflow prevention diodes in said adapted stepper motor control circuit.

14. The method of claim 10, wherein said steps of maintaining a connection between a first stepper motor control channel and a stepper motor using a solid state switching circuit in said first stepper motor control channel and maintaining a disconnection between a second stepper motor control channel and the stepper motor using a solid state switching circuit in said second stepper motor control channel are controlled via the channel in-control logic circuit located in said first channel.

15. The method of claim 10, wherein said steps of maintaining a connection between a first stepper motor control channel and a stepper motor using a solid state switching circuit in said first stepper motor control channel and maintaining a disconnection between a second stepper motor control channel and the stepper motor using a solid state switching circuit in said second stepper motor control channel are controlled via the channel in-control logic circuit located in said second channel.

16. The method of claim 10, wherein said steps of maintaining a connection between a first stepper motor control channel and a stepper motor using a solid state switching circuit in said first stepper motor control channel and maintaining a disconnection between a second stepper motor control channel and the stepper motor using a solid state switching circuit in said second stepper motor control channel are controlled via the channel in-control logic circuit located in an independent channel in-control controller.

17. A method for detecting a fault within a stepper motor control channel comprising the steps of:
  detecting an increase in a Pulse Width Modulation duty cycle when said stepper motor control channel is connected to a stepper motor, and thereby detecting a presence of an open circuit fault within said stepper motor control channel using a channel in-control logic circuit;
  initiating a predetermined response action using the channel in-control logic circuit in response to the detected open circuit fault; and wherein the stepper motor control channel includes a stepper motor control circuit for connecting a power source to the stepper motor, a master high side switch connecting a high side of an adapted dual H-bridge to said power source, a master low side switch connecting a low side of said adapted dual H-bridge to a ground, and a microprocessor operable to control said adapted dual H-bridge stepper motor control circuit.

* * * * *